United States Patent Office 2,920,004
Patented Jan. 5, 1960

2,920,004

METHOD OF TREATING DRYING OIL IMPREGNATED GRAPHITE ELECTRODE

William W. Carlin, Corpus Christi, Tex., assignor to Columbia-Southern Chemical Corporation, Allegheny County, Pa., a corporation of Delaware No Drawing. Application February 20, 1958
Serial No. 716,274

9 Claims. (Cl. 117—228)

The present invention relates to improved carbon and graphite electrodes. More particularly, the present invention relates to an improved method of treating carbon and graphite electrodes having a drying oil in the pores thereof in order to render them less susceptible to deterioration when utilized in electrolytic cells such as alkali-chlorine cells.

In the production of chlorine by the electrolytic dissociation of aqueous alkali metal salt solutions such as NaCl, KCl and the like in electrolytic cells, excessive carbon and graphite consumption and deterioration of carbon and graphite electrodes often occurs. Carbon and graphite electrodes being porous become permeated with the solution to be dissociated during electrolytic operations of this type. As a result of absorption of electrolyte by cell electrodes in these electrolytic processes, chlorine and oxygen are liberated within the voids of the electrodes which causes oxidation of the electrodes and eventual disintegration of them.

Many methods have been devised to alleviate this condition. Thus, carbon and graphite electrodes used in this process are usually impregnated with drying or semi-drying oils such as linseed oil, China-wood oil, oiticica oil, dehydrated castor oil, soya oil, and the like, which renders the electrodes less porous and more resistant to the cell electrolyte.

While oil impregnation proves beneficial in reducing absorption of electrolyte by cell electrodes, it is not entirely satisfactory. During cell operation, it is found that swelling of the oil in the pores of the electrodes often occurs. This swelling of oil causes electrodes to exude or sweat oil and results in eventual wearing away and premature consumption of the graphite of the electrodes affected. Oil exudation further causes obstruction of diaphragms in diaphragm type cells such as the cell described in United States Patent 1,866,065. Diaphragm obstruction requires shutdown of the affected cells for replacement or cleaning of the diaphragms and seriously impairs the efficiency and productivity of electrolytic processes conducted in these cells.

In order to eliminate these undesirable conditions treatment of oil impregnated carbon and graphite electrodes with gaseous chlorine and solutions containing chloride ions has been proposed. Treatment of the oil contained in the pores of carbon and graphite electrodes in this manner results in a partial chlorination of the oil in the graphite which effects some reduction in the amount of sweating and other attendant operational difficulties encountered in the operation of electrolytic cells. Some reduction in graphite consumption is also experienced due to these surface type chlorinations. While these treatments of oil impregnated carbon and graphite electrodes are per se beneficial, considerable excess carbon and graphite consumption still occurs with the operational difficulties hereinabove referred to also taking place.

According to the present invention, it has been found that by specially treating oil impregnated carbon and graphite electrodes (in which the oil is at least partially in a solidified or polymerized or dried state) to accomplish a deep penetrating chlorination of their oil content, more substantial reductions in carbon and graphite consumption are thereby achieved. Operational difficulties normally associated with the operation of such cells are minimized or eliminated as a result of this treatment.

Thus, by the method of the present invention, carbon and graphite electrodes having a drying oil (including semi-drying oils) present in the pores thereof are contacted with elemental chlorine in liquid state, for example, elemental liquid chlorine for a period of time sufficient to substantially chlorinate the oil content of the electrodes. Liquid chlorine penetrates the entire electrode chlorinating the oil throughout. Carbon and graphite electrodes having drying oils in their pores when treated in this manner are found to be extremely resistant to chemical attack when utilized in an electrolytic cell such as an alkali-chlorine cell.

While elemental chlorine at temperatures and pressures under which the elemental chlorine normally exists in a liquid state may be utilized in accordance with this invention, it is also permissible to conduct the process with mixtures of liquid chlorine and other liquids as long as the chlorine is present as dissolved elemental chlorine and, thus, is in the liquid state. Generally speaking, non-aqueous mixtures of liquid chlorine, for example, mixtures of liquid chlorine and liquid hydrocarbon chloride solvents such as carbon tetrachloride, chloroform, perchloroethylene, trichloroethylene, mixtures of these solvents, and other like compounds may be employed without detrimental effect. Liquid chlorine used alone or elemental chlorine in solvent may contain water in minor or trace amounts so long as there is present a substantial quantity of elemental chlorine, for example, above about 2 to 5 percent by weight of the mixture. Normally, the mixture is preponderantly anhydrous in character.

In accordance with a further embodiment of this invention, it has been found that the presence of liquid bromine in the liquid chlorine containing chlorinating medium has an enhancing effect upon the chlorination of oil impregnated graphite. Thus, liquid chlorine containing solutions containing liquid bromine are particularly suitable in producing chlorination of the oil content of graphite electrodes throughout. A liquid mixture of bromine and chlorine may be employed, but it is more desirable to employ mixtures which include in addition to liquid chlorine and bromine substantial quantities of a liquid chlorinated hydrocarbon solvent such as chloroform, carbon tetrachloride, tetrachloroethane, mixtures of these and other like compounds. In mixtures of the above mentioned type, liquid chlorine concentrations may range from about 2 to about 35 percent by weight while the liquid bromine concentrations range between about 2 to about 40 percent by weight. The concentrations of liquid hydrocarbon solvent or mixture of solvents employed will range from 25 to 95 percent by weight.

A particularly effective chlorinating mixture is a waste material obtained from chlorine purification systems associated with the production of chlorine from electrolytic alkali-chlorine cells. This solution is known by various terms such as reboiler solution, reboiler gunk, chlorine still bottoms and the like. The use of this particular chlorinating solution not only produces superior chlorinations but also utilizes effectively a waste product from a chlorine production process which results in enhancing the production of chlorine. Considerable reduction in chlorine production costs are achieved utilizing this material as a chlorinating agent. Utilization of this waste solution in accordance with the practice of this invention contributes to cost reduction by producing graphite electrodes which, when utilized as cell anodes in chlorine producing alkali-chlorine cells, are extremely resistant to chemical attack and suffer considerably less carbon consumption than graphite not treated in this manner. For these reasons, the use of this waste solution forms a preferred embodiment of the instant invention.

Chlorine is produced electrolytically in cells characteristic of the type described in United States Patent 1,866,065, granted July 5, 1932. Broadly, a cell of this type has a bottom, usually constructed of concrete, within which there is positioned a lead slab. The graphite anodes of the cell are embedded in the lead slab in spaced parallel relationship and rise vertically from it. The cell cathode is a pliable material, such as wire mesh suitably impregnated with asbestors thereby forming a diaphragm thereon, and is carried by an intermediate member, usually of steel construction. The cell cathode is formed into hollow projections or fingers so that when in place on the cell the cathode fingers occupy spaces between the anode blades. The cells have four sides on which the cover member rests, forming a closed compartment, a portion of the sides being formed by the cathode frame.

In operation, brine is introduced into this cell at the top and contacts the cell anodes. When current is introduced in the cell, chlorine is liberated at the cell anode. Caustic and hydrogen are liberated on the cathode side of the cell. Outlets are provided in the cell bottom and sides for the caustic and hydrogen respectively. Chlorine is liberated through an outlet in the cell cover.

The chlorine, after liberation from the cell, is purified for commercial use by a series of steps. Thus, after removal from the cells, chlorine is passed through sulfuric acid to remove moisture from the chlorine. The dried chlorine is then cooled and compressed. The dried, compressed chlorine is then bubbled through liquid chlorine contained in a vessel. The purified gas is recovered from the top of the vessel above the level of the liquid chlorine. The liquid in the vessel is sent periodically to a tank or reboiler where it is heated, thereby flashing off some of the chlorine. This chlorine may be recycled to the compressing stage and thereby recovered as product. The liquid bottoms remaining after this heating step is the waste reboiler solution hereinbefore referred to. Normally, it is disposed of as waste.

In accordance with this invention, the bottoms from the reboiler are pumped directly to a closed tank which has placed therein graphite electrodes containing in their pores a drying or semi-drying oil. The electrodes are covered with the reboiler solution or bottoms and contact maintained for a time sufficient to chlorinate the oil content of the electrodes substantially throughout the entire electrodes.

Typically, reboiler solutions will usually contain predominantly liquid chlorine and bromine, chloroform and carbon tetrachloride. In addition, varying amounts of chlorinated hydrocarbons such as hexachloroethane, tetrachloroethane, dichloroethane and the like are also usually present. Traces of inorganic materials such as iron, sodium and the like may also be found. The source or location of the brine employed in the electrolytic alkali-chlorine cells will determine the composition of the reboiler solution. A reboiler solution obtained from an electrolytic alkali-chlorine system using brine obtained from a Texas brine field analyzed as follows: chlorine, 10 percent; bromine, 30 percent; chloroform, 35 percent; carbon tetrachloride, 10 percent; hexachloroethane and residues such as iron, sodium, tetrachloroethane, dichloroethane, 15 percent. All percentages given are by weight. These liquid mixtures will usually contain small amounts of materials in solid state such as hexachloroethane, but their presence has no detrimental effect on the effectiveness of the solutions as a chlorinating agent. As long as the reboiler material has present therein 2 to 30 percent chlorine by weight and 2 to 40 percent bromine by weight, with the liquid chlorinated hydrocarbons ranging from about 30 to about 96 percent by weight, the solution will be effective. Reboiler solutions obtained from processes employing brines in other localities will vary in their bromine and chlorine content from the reboiler solution analyzed above, but will fall within the range of concentrations hereinbefore mentioned. Thus, a reboiler solution recovered from an electrolytic alkali-chlorine process employing a brine obtained in Ohio analyzed 10 percent chlorine, 9.08 percent bromine and 78.7 percent chlorinated hydrocarbons by weight. Another reboiler solution taken from an electrolytic alkali-chlorine process employing brine obtained in Louisiana analyzed 4.8 percent chlorine, 29.6 percent bromine and 65.6 percent chlorinated hydrocarbons. As can be readily seen, all of these solutions contain bromine, chlorine and chlorinated hydrocarbons in the ranges hereinbefore set forth.

In accordance with the practice of the present invention, oil impregnated carbon and graphite electrodes are preferably totally immersed in the chlorinating medium to insure a more complete contact between the electrodes and the liquid chlorine. While total immersion of the electrodes is the preferred mode of operation, other methods of contact may also be employed. Thus, for example, liquid chlorine containing solution may be sprayed as a liquid on the surface of the electrodes or permitted to flow over them. Any form of contact between the liquid chlorine and the electrodes that will insure adequate surface contact for a sufficient length of time to accomplish chlorination of the drying oil content of the electrodes is permissible.

The length of time that treatment of the electrodes with the liquid chlorine containing solution is conducted will vary considerably and depends upon the thickness of the electrode treated, the degree of chlorination desired and the temperatures and pressures employed. Generally, the treatment is conducted until the product is largely chlorinated in the interior thereof. Frequently, this is manifested by a substantial reduction in iodine number of the oil in the electrode, and often the iodine number falls to 2 or below. Thus, for example, treatments for periods of time ranging from between about 30 minutes to about 24 hours effectively produce these results. Since time in some measure determines the economy of the treatment, preferably the oil impregnated electrodes are contacted with the liquid chlorine for between about 1 hour to about 8 hours.

The temperature and pressures employed during treatment may be varied considerably without seriously affecting the efficiency of the treatment. Of course, it is necessary to maintain the chlorine in the liquid state and this consideration will limit the variations of temperature and pressure employed. Preferably, the process is conducted at or just slightly above atmospheric pressure. Under these pressure conditions, temperatures in the range of −34° C. to −50° C. are particularly suitable when the chlorinating solution is substantially completely liquid chlorine. When liquid chlorine in solvent or mixtures of liquid chlorine and liquid bromine with or without solvent are employed, temperatures may be raised considerably so that, for example, temperatures of the order of −10° C. to 30° C. may be effectively employed. Pressures considerably above atmospheric, for example, 2 to 8 atmospheres or more, generally reduce the time of treatment and may be employed so long as temperatures are suitably adjusted to maintain the chlorine in the liquid state. In a similar fashion, if desired subatmospheric pressure, for example, ¼ to ½ atmosphere are also employable, though generally they tend to lengthen the time of treatment. Once again, however, temperatures must be adjusted during operations under reduced pressure in order to maintain the chlorine liquid.

Various types of electrodes are susceptible to the treatment of the instant invention. Thus, any electrode constructed of porous materials such as carbon, graphite and graphitized carbon which contain a drying oil in the pores may be subjected to this treatment successfully. Electrode elements of this type are generally employed as anodes in electrolytic cells of the alkali-chlorine type such as disclosed in United States Patent 1,866,065. While the invention applies to carbon structures as well as graphite in electrolytic cells of the above type, graphite anodes are preferred.

Oil impregnation of the carbon or graphite electrode may be conducted in any conventional manner so long as the pores of the electrode are impregnated with a sufficient amount of drying oil. Generally, an impregnation with a drying oil conducted so as to provide between 5 to 15 percent by weight of oil in a graphite electrode is suffifficient. Stated another way, if 40 to 90 percent of the voids or pores of the electrode are filled with the drying oil, the impregnation is deemed sufficient. Generally, impregnation is accomplished by placing the electrode to be impregnated in a closed air tight container. The container is then evacuated to an absolute pressure of about 100 to about 200 millimeters of mercury. A drying or semi-drying oil such as linseed oil, China-wood oil, oiticica oil, dehydrated castor oil, soya oil and the like is then admitted to the container and the pressure in the container raised to superatmospheric, for example, to between 5 and 20 atmospheres' pressure. Impregnation generally requires maintaining the electrode in place with the oil from between 2 to 12 hours.

Carbon and graphite electrodes suitably impregnated with a drying oil are generally subjected to further treatment in order to render the oil contained therein solid. Thus, it is common practice to dry electrodes of this type by aging them outdoors. This aging of oil impregnated graphite oxidizes the oil content to varying degrees thereby solidifying it. Another expedient commonly employed is the application of heat to the electrode elements containing the drying oil in their pores. Heat causes polymerization of the oil and solidifies it in the pores. The completeness of the oxidation or the polymerization, of course, will depend on the length of treatment and in the case of polymerization the intensity of the heat application.

The following examples are given as illustrative of the method of the present invention.

EXAMPLE I

Two graphite blades 5 inches long, 1 inch wide and 1 inch thick, constructed of Acheson graphite AGR-58 were used. This graphite is manufactured by the National Carbon Company under the name AGR-58 and is a linseed oil impregnated graphite. The linseed oil is present in the graphite pores in a solidified condition. The two graphite blades were placed in a container of liquid chlorine so that they remained totally immersed in the liquid during the entire period of treatment. The liquid chlorine was maintained at a temperature of —34° C. and at a pressure of 760 millimeters of mercury for a period of 30 minutes. The graphite blades were then removed from the container and the chlorine adhering to the blades allowed to flash off at ambient temperature (25° C.).

EXAMPLE II

A laboratory electrolytic diaphragm type alkali-chlorine cell was employed to test the graphite blades of Example I. The cell was a cylindrical shaped structure constructed from a Pyrex tube 6 inches in diameter and 8½ inches high, open at both ends. The top and bottom of the cell were constructed of Haveg 41 discs which consist of a molded structural resin which is acid and alkali resistant and manufactured under the trade name Haveg. The disc forming the cell cover was provided with several openings for the insertion of electrical connections to the four cell anodes, a thermostat, a heater, a brine inlet feed pipe and a chlorine outlet line. The disc forming the cell bottom contained a single opening which was utilized for a hydrogen and caustic outlet and also accommodated the cathode current lead. The cell cathode was constructed of a 10 mesh iron screen having an asbestos paper diaphragm and supported on the cell bottom by a solid Haveg cylindrical support. The cathode screen was embedded in the Haveg support on its outer rim thus providing a hollow cylindrical shaped catholyte compartment. A Haveg plug was provided to cover the catholyte compartment. A hollow steel tube inserted into the catholyte compartment through the cell bottom and the centrally located cathode support served to limit cell liquor level in the catholyte compartment.

Two blades constructed of the same batch of Acheson graphite AGR-58 as the blades of Example I, measuring 5 inches long, 1 inch wide and 1 inch thick but untreated as the blades of Example I were utilized as two of the cell anodes. The two graphite blades from Example I were employed as the other two cell anodes. The cell was operated under normal conditions to produce chlorine and caustic soda from brine for a period of 626 hours. At the end of this period, the graphite blades were examined to determine graphite consumption in the treated blades and the untreated blades. The results appear in Table I below:

*Table I*

| | Liquid Chlorine Treated Graphite | Untreated Graphite |
|---|---|---|
| Volume of Graphite by H₂O Displacement at Start of Run _____cc__ | 173.0 | 173.5 |
| Graphite Density _____ | 1.774 | 1.728 |
| Total Weight of the Graphite in Grams at Start (calculated)¹ _____ | 306.9 | 299.8 |
| Volume of H₂O Loss at End of Run _____cc__ | 16.5 | 20.0 |
| Grams of Graphite Consumed (calculated)¹ _____ | 29.27 | 34.56 |

¹ Calculated weights were determined by multiplying the amount of displaced water by the density of the graphite.

As can be readily seen, the treated anode blades suffered considerably less losses than the untreated blades. This example shows a reduction in graphite consumption in the treated blades of 18 percent over untreated graphite which represents a considerable economic advantage on a commercial scale operation.

EXAMPLE III

An oil impregnated graphite blade 5 inches long, 1 inch wide and ½ inch thick was constructed of Acheson AGR-58 graphite. This graphite is manufactured under the name AGR-58 and is a linseed oil impregnated graphite. The linseed oil is present in the graphite pores in a solidified condition. This graphite blade was placed in a tank and a liquid mixture of liquid chlorine and chlorinated hydrocarbons was admitted to the tank until the blade was completely covered with solution. The composition of the liquid mixture is shown in Table II. The tank was covered with a metal top provided with a vent. The solution was admitted to the tank at 0° C. No cooling was provided and the solution remained in contact with the graphite blade for 15 hours at ambient temperature (25° C.) Gas was released from the tank through the vent periodically so that pressure on the tank did not exceed 3 inches of water. After removal from the tank, the blade surface was cleaned with a wire brush and was ready for service.

*Table II*

ANALYSIS OF THE LIQUID CHLORINATING MIXTURE OF EXAMPLE III

| | Percent by weight |
|---|---|
| Chlorine | 10 |
| Bromine | 30 |
| Chloroform | 35 |
| Carbon tetrachloride | 10 |
| Hexachloroethane and residues | 15 |

EXAMPLE IV

The electrode of Example III was placed in a laboratory cell of the type described in Example II and utilized as a cell anode. Another graphite blade constructed of the same Acheson graphite AGR–58 as used in Example III and having the same dimensions but not otherwise treated was placed in a similar laboratory cell. Both cells were operated under the same conditions to produce chlorine and caustic from brine for a period of 40 hours. At the end of the run, the anodes were removed and physical measurements taken to determine the loss of graphite in both treated and untreated anodes. The untreated anode suffered an average of 7.7 millimeters' loss in width and an average of 1.7 millimeters' loss in thickness. The treated anode, on the other hand, suffered a loss of only 5.4 millimeters in width and 0.4 millimeter in thickness. As can be readily seen, a drastic reduction in graphite consumption occurred in the treated anode over the untreated anode.

EXAMPLE V

Fifty milliliters of linseed oil were added to 250 milliliters of the solution shown in Table II at ambient temperature (25° C.). A vigorous reaction took place with chlorine and bromine both being evolved. When the reaction subsided, the balance of the chlorinating solution remaining was flashed off by heating the solution with an infrared lamp. The sample was then subjected to analysis. The iodine number of the treated linseed oil was found to be 2 as opposed to a 167 for untreated linseed oil of the same type. A total chlorine analysis of the treated oil by Parr bomb fusion showed a chlorine content of 78 percent by weight, indicating a substantial amount of substitution had occurred.

Chlorination of the oil content of graphite electrodes impregnated with drying or semi-drying oils as practiced by the methods of this invention result in a chlorination of the oil content throughout the entire electrode. Electrodes so treated are found to be novel and contain between 40 to 80 percent by weight chlorine in the oil content thereof. Thus, chlorination occurs in the treated electrodes at substantial depths, not merely upon surfaces.

While the invention has been described with reference to certain specific examples, it is not intended that the invention be limited thereto except insofar as appears in the appended claims.

I claim:

1. A method of preparing an improved graphite electrode which comprises contacting a graphite electrode having a drying oil present in the pores thereof with a liquid mixture of elemental chlorine and bromine for between about 30 minutes to about 24 hours.

2. A method of preparing an improved graphite electrode which comprises contacting a graphite electrode having a drying oil present in the pores thereof with liquid chlorine for a period of time sufficient to chlorinate substantially the oil content of the electrode.

3. A method of preparing an improved graphite electrode which comprises contacting a graphite electrode having a drying oil present in the pores thereof with a liquid mixture of elemental chlorine and a liquid hydrocarbon chloride for a period of time sufficient to chlorinate substantially the oil content of the electrode therein.

4. A method of preparing an improved graphite electrode which comprises contacting a graphite electrode having a drying oil present in the pores thereof with a liquid mixture of elemental chlorine and bromine for a period of time sufficient to chlorinate substantially the oil content of the electrode.

5. A method of preparing an improved graphite electrode which comprises contacting a graphite electrode having a drying oil present in the pores thereof with a liquid mixture of elemental chlorine, elemental bromine and hydrocarbon chlorides for a period of time sufficient to chlorinate substantially the oil content of the electrode.

6. A method of preparing an improved graphite electrode which comprises contacting a graphite electrode having a drying oil present in the pores thereof with liquid chlorine for a period of time sufficient to chlorinate substantially the oil content of the electrode, said drying oil being present in a substantially solidified state.

7. A method of preparing an improved graphite electrode which comprises contacting a graphite electrode having a drying oil present in the pores thereof with liquid chlorine for between about 30 minutes to about 24 hours.

8. A method of preparing an improved graphite electrode suitable for use in an electrolytic alkali-chlorine cell comprising contacting a graphite electrode having a drying oil present in the pores thereof, said drying oil being present in a substantially solidified state, with a liquid mixture of chlorine, bromine and liquid hydrocarbon chlorides, said liquid mixture containing from 2 to 30 percent chlorine, 2 to 40 percent bromine and 30 to 96 percent liquid hydrocarbon chlorides for between about 30 minutes to 24 hours.

9. A method of preparing an improved graphite electrode suitable for use in an electrolytic alkali-chlorine cell comprising contacting a graphite electrode having a drying oil present in the pores thereof, said drying oil being present in a substantially solidified state, with a liquid mixture of chlorine, bromine and chlorinated hydrocarbon solvents, said liquid mixture containing from 2 to 30 percent chlorine, 2 to 40 percent bromine, and 30 to 96 percent chlorinated hydrocarbon solvents for a period of time sufficient to chlorinate substantially the oil content of the electrode.

References Cited in the file of this patent

UNITED STATES PATENTS

| | | |
|---|---|---|
| 1,861,415 | Hunter et al. | May 31, 1932 |
| 1,927,661 | Hunter | Sept. 19, 1933 |
| 2,067,738 | Suzuki | Jan. 12, 1937 |

UNITED STATES PATENT OFFICE
CERTIFICATE OF CORRECTION

Patent No. 2,920,004                 January 5, 1960

William W. Carlin

It is hereby certified that error appears in the printed specification of the above numbered patent requiring correction and that the said Letters Patent should read as corrected below.

Column 3, line 15, for "asbestors" read -- asbestos --; column 5, line 14, for "suffifficient" read -- sufficient --.

Signed and sealed this 25th day of October 1960.

(SEAL)
ttest:

KARL H. AXLINE
ttesting Officer

ROBERT C. WATSON
Commissioner of Patents